United States Patent [19]

Murakami et al.

[11] 4,264,667

[45] Apr. 28, 1981

[54] POLYESTER FILM

[75] Inventors: Tetsushi Murakami; Koichi Matsunami, both of Otsu; Tsutomu Isaka, Inuyama; Yasutomi Yoshino, Inuyama; Yukinobu Miyazaki, Inuyama, all of Japan

[73] Assignee: Toyo Boseki Kabushiki Kaisha, Osaka, Japan

[21] Appl. No.: 908,656

[22] Filed: May 23, 1978

Related U.S. Application Data

[63] Continuation of Ser. No. 730,982, Oct. 8, 1976, abandoned.

[30] Foreign Application Priority Data

Oct. 11, 1975 [JP] Japan ................................ 50-122601

[51] Int. Cl.[3] ................................................ B32B 27/06

[52] U.S. Cl. ........................................ 428/195; 428/35; 428/480

[58] Field of Search .................................. 428/480, 35

[56] References Cited

U.S. PATENT DOCUMENTS

| | | | |
|---|---|---|---|
| 2,823,421 | 2/1958 | Scarlett | 264/289 |
| 3,652,713 | 3/1972 | Okazaki et al. | 260/860 |
| 3,702,350 | 11/1972 | Kimura et al. | 260/860 |
| 3,970,729 | 7/1976 | Walsh et al. | 260/45.7 P |
| 4,061,615 | 12/1977 | Couchoud | 428/480 |
| 4,064,312 | 12/1977 | Crystal | 428/480 |

*Primary Examiner*—George F. Lesmes
*Assistant Examiner*—E. Rollins Buffalow
*Attorney, Agent, or Firm*—Birch, Stewart, Kolasch & Birch

[57] ABSTRACT

A transparent polyester film having excellent antistatic properties, which are little effected with variation of the humidity, and further having excellent flexing resistance, pinhole resistance and printability, which is made from a mixture comprising (i) a polyester consisting essentially of a residue of dibasic acids wherein at least 80% by mol is terephthalic acid and a residue of at least one glycol and (ii) a block copolyester consisting of a crystalline polyester segment having a high melting point and a soft polymer segment having a low melting point and a number average molecular weight of 400 to 8,000, said soft polymer segment having a low melting point being contained in an amount of 0.5 to 10% by weight on the basis of the whole weight of the components (i) and (ii), and (iii) a sulfonic and/or phosphoric acid metal salt having a good heat resistance, and which is produced by melt-extruding the mixture of the components (i), (ii) and (iii), drawing at least uniaxially and then heat-treating the resultant at a temperature of 170° C. or higher and lower than the melting point of the polyester (i).

28 Claims, 1 Drawing Figure

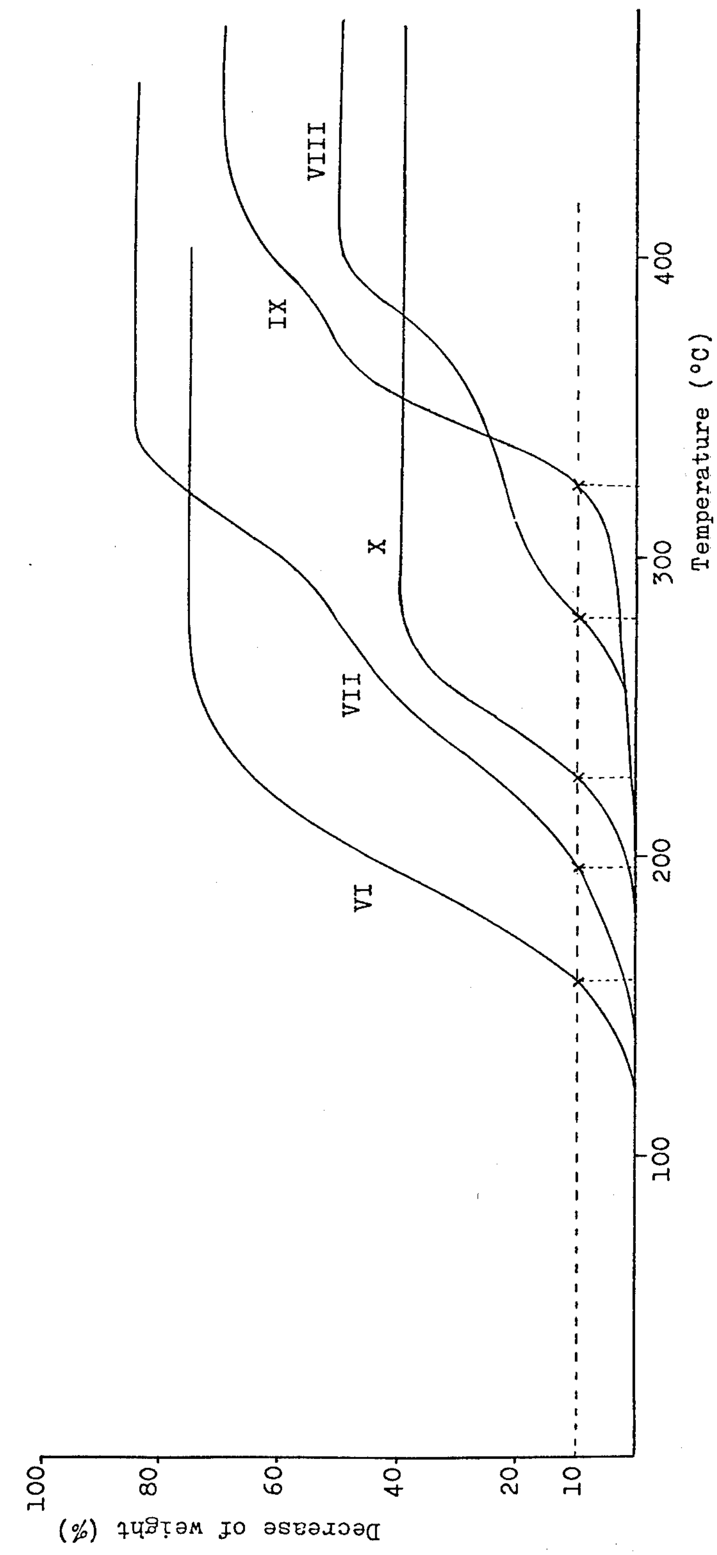
Decrease of weight (%)
100
80
60
40
20
10
Temperature (°C)
100
200
300
400
VI
VII
VIII
IX
X

POLYESTER FILM

This application is a continuation of copending application Ser. No. 730,982, filed on Oct. 8, 1976, now abandoned.

The present invention relates to a polyester film, more particularly, a transparent polyester film having excellent antistatic properties, which are little effected with variation of the humidity, and further having excellent flexing resistance, pinhole resistance and printability.

It has recently been intended to use polyester films (e.g. polyethylene terephthalate film) for packaging of foods and industruial parts, protecting films, or the like, since they have a high crystallizability and excellent transparency, mechanical properties, chemical resistance and heat resistance. When the films are used for these packagings, severe burden is given to the films, and in such a case, the conventional polyester films have various defects. For instance, polyesters have high electrical insulation properties and the films produced therefrom are electrically charged during use as packagings, which causes various troubles. Particularly, under a low humidity atmosphere, the occurrence of the static electricity becomes larger, which causes the lowering of the workability and the value of the products.

It is known that the antistatic properties can be given to the films by coating an antistatic agent on the surface of the films or incorporating an antistatic agent within the films. However, the conventional polyester films will not necessarily show the desired antistatic properties by these known methods, and there is not known any polyester film having sufficient antistatic properties under a low humidity environment.

Besides, in the packages which bear with the treatment under severe conditions, such as vacuum packaging, the packaging bar made of polyester film has a corner or a projection, on which the stress concentrates, and as the result, pinholes are formed therein and air or microorganisms get in the pinholes. Moreover, in a retort packaging (i.e. packaging suitable for sterilization at a high temperature and a high pressure), the film is shrunk or deteriorated during the sterilization step, and thereby the film becomes brittle, which results in the break of the package, particularly in the case where the film has a sufficient water resistance. In frozen food packaging, the package has many sharp corners since the contents thereof are frozen and the contents are hardly deformed and therefore the package is significantly injured.

It has been desired that the packaging materials be readily printed with conventional printing inks for the cellulose films which is a quick-drying ink having good color tone, from the economical and qualitative viewpoints.

It is very difficult to eliminate even one of these defects, inferior pinhole resistance, flexing resistance, printability and antistatic properties, and it is more difficult to obtain a polyester film improved in all of the properties.

The present inventors have intensely studied to find an improved polyester film having excellent toughness (e.g. pinhole resistance and flexing resistance), printability and further antistatic properties which are little effected with variation of the humidity, and they have now found a polyester film comprising a specific polyester and a specific block copolyester and a specific sulfonic and/or phosphoric acid metal salt which has the desired properties and is suitable as the packaging material.

An object of the present invention is to provide an improved transparent polyester film having excellent pinhole resistance, flexing resistance, printability and further antistatic properties.

Another object of the invention is to provide an improvement in the antistatic properties of the polyester film.

A further object of the invention is to provide a polyester film suitable for the packaging of foods and/or other materials.

A still further object of the invention is to provide a polyester film which can be printed with a conventional printing ink for cellulose films.

Other object and further scope of applicability of the present invention will become apparent from the detailed description given hereinafter; it should be understood, however, that the detailed description and accompanying specific examples, while indicating preferred embodiments of the invention, are given by way of illustration only, since various changes and modifications within the spirit and scope of the invention will become apparent to those skilled in the art from this detailed description. These changes and modifications are intended to be encompassed within the scope of this invention.

The polyester film of the present invention is made from a mixture comprising (i) a polyester consisting of a residue of dibasic acids wherein at least 80% by mol is terephthalic acid and a residue of glycols and (ii) a block copolyester consisting of a polyester segment having a high melting point and a soft polymer segment having a low melting point, said soft polymer segment having a low melting point being contained in an amount of 0.5 to 10% by weight on the basis of the whole weight of the components (i) and (ii), and (iii) a sulfonic and/or phosphoric acid metal salt having a good heat resistance, (i.e. the initial temperature showing a substantial decrease of the weight is 200° C. or higher when it is heated in air), said sulfonic and/or phosphoric acid metal salt being contained in an amount of 0.05 to 5% by weight on the basis of the whole weight of the components (i), (ii) and (iii), and is produced by melt-extruding the mixture of the components (i), (ii) and (iii), drawing at least uniaxially and then heat-treating the resultant at a temperature of 170° C. or higher and lower than the melting point of the polyester (i).

The polyester consists of a residue of dibasic acids wherein at least 80% by mol is terephthalic acid and a residue of glycols, which may be referred to "terephthalic polyester" hereinafter. Thus, the dibasic acid residue of the polyester comprises predominantly terephthalic acid residue, and less than 20% by mol thereof may be a residue of one or more other dibasic acids, such an isophthalic acid, phthalic acid, adipic acid, sebacic acid, succinic acid or oxalic acid, or may be a residue of an oxyacids, such as p-hydroxybenzoic acid. The glycol residue may be a residue of the conventional alkylene glycols or cycloalkylene glycols, such as ethylene glycol, propylene glycol, trimethylene glycol, tetramethylene glycol, hexamethylene glycol, or cyclohexanedimethanol, preferably ethylene glycol or tetramethylene glycol. The terephthalic polyesters are crystalline and have usually a melting point of 210° to 265° C. When the polyester contains less than 80% by mol of the terephthalic acid residue, the film is disadvantageously inferior in the dimention stability and mechanical strength. Particularly suitable terephthalic polyesters are polyethylene terephthalate and polytetramethylene terephthalate.

The block copolyester consists of a crystalline polyester segment having a high melting point and a soft polymer segment having a low melting point and a number average molecular weight (hereinafter, referred to as merely "molecular weight") of 400 to 8,000, said crystalline polyester segment having a melting point of at least 170° C. when a polymer is produced by the monomers composing the segment alone and said soft polymer segment having a melting or softening point of 100° C. or lower.

The crystalline polyester segment having a high melting point has a melting point of at least 170° C. when a polymer having fiber-forming properties is produced by the monomer composing the segment alone, and may be a segment of a polyester consisting of a residue of aromatic dicarboxylic acids (e.g. terephthalic acid, isophthalic acid, 1,5-naphthalenedicarboxylic acid, or 2,6-naphthalenedicarboxylic acid) and a residue of aliphatic, aromatic or alicyclic diols (e.g. ethylene glycol, propylene glycol, tetramethylene glycol, pentamethylene glycol, 2,2-dimethyltrimethylene glycol, hexamethylene glycol, p-xylylene glycol, or cyclohexanedimethanol); a segment of a copolyester containing a residue of oxyacids [e.g. p-(β-hydroxyethoxy)benzoic acid, or p-hydroxybenzoic acid] in addition to the residues of the dicarboxylic acids and the glycols above-mentioned; a segment of a polyether ester consisting of a residue of aromatic ether dicarboxylic acids [e.g. 1,2-bis(4,4'-dicarboxymethylphenoxy)ethane, or di(4-carboxyphenoxy)ethane] and a residue of the diols as mentioned above; or a segment of a polyamidoester consisting of a residue of aromatic amidodicarboxylic acids [e.g. bis(N-p-carbethoxyphenoxy)terephthalimide] and a residue of the diols as mentioned above. Particularly suitable examples of the crystalline polyester segment are a segment of a polyester consisting of terephthalic acid-ethylene glycol, terephthalic acid-tetramethylene glycol, terephthalic acid-isophthalic acid-ethylene glycol, or terephthalic acid-isophthalic acid-tetramethylene glycol.

The soft polymer segment having a low melting point and a molecular weight of 400 or more is substantially in the non-crystalline state in the polyester block copolymer and has a melting or softening point of 100° C. or lower when it is measured on the said segment alone. The molecular weight of the soft polymer segment is usually 400 to 8,000. When the molecular weight is less than 400, the block copolyester thus obtained has a too low melting point and shows too large adhesion, which results in the inferior processability into a film and further does not give the desired toughness (e.g. impact resistance and pinhole resistance) to the polyester. On the other hand, when the molecular weight is more than 8,000, the phase of the non-crystalline polymer segment having a low melting point is separated, and as the result, the block copolyester shows an extremely high melting viscosity and becomes hard and brittle. Accordingly, after the copolymerization reaction, the block copolyester thus obtained can hardly be removed from the reaction vessel, and further when the block copolyester is used, the polyester film shows an inferior transparency. Preferred molecular weight of the soft polymer segment is from 700 to 6,000.

The soft polymer segment having a low melting point is contained in the polyester block copolymer in the ratio of 5 to 95% by weight, preferably 10 to 90% by weight. The components composing the soft polymer segment may be a polyether (e.g. polyethylene oxide glycol, polypropylene oxide glycol, polytetramethylene oxide glycol, a glycol copolymer of ethylene oxide and propylene oxide, or a glycol copolymer of ethylene oxide and tetrahydrofuran), an aliphatic polyester (e.g. polyneopentyl azelate, polyneopentyl adipate, or polyneopentyl sebacate), or a polylactone (e.g. poly-ε-caprolactone, or polypivarolactone). Particularly suitable examples of the soft polymer segment having a low melting point are a residue of a polyethylene oxide glycol or a polytetramethylene oxide glycol.

Suitable examples of the block copolyester used in the present invention are polyethylene terephthalatepolyethylene oxide block copolymer, polytetramethylene terephthalateopolyethylene oxide block copolymer, polyethylene terephthalatepolytetramethylene oxide block copolymer, polytetramethylene terephthalate-polytetramethylene oxide block copolymer, polyethylene terephthalate-polyethylene oxide polypropylene oxide block copolymer, polyethylene terephthalate-poly-ε-caprolactone block copolymer, polyethylene terephthalate-polypivarolactone block copolymer, polyethylene terephthalate-polyethylene adipate block copolymer, polyethylene terephthalate-polyneopentyl sebacate block copolymer, polytetramethylene terephthalate-polyethylene dodecanate block copolymer, polytetramethylene terephthalate-polyneopentyl dodecanate block copolymer, a block copolymer of a polyester made from di(4-carboxyphenoxy)ethane and ethylene glycol with polyethylene glycol, or a block copolymer of a polyester made from bis(N-p-carboxyethoxyphenyl)adipamide and ethylene glycol with polyethylene glycol.

In the mixture for producing the polyester film, the soft polymer segment having a low melting point is contained totally in the range of 0.5 to 10% by weight, preferably 0.5 to 5% by weight on the basis of the whole weight of the polyester (i) and the block copolyester (ii). When the content is less than 0.5% by weight, it does not show the sufficient effect, and on the other hand, when the content is more than 10% by weight, the effect thereof does not increase and rather it shows an adverse result, such as the decrease of the transparency and other physical properties of the film. When the content of the soft polymer segment having a low melting point is in the suitable range as mentioned above in the mixed polymer of the terephthalic polyester and the block copolyester, the mixed ratio of the terephthalic polyester and the block copolyester is preferably in the range of 99.4:0.6 to 20:80 by weight (terephthalic polyester:block copolyester), more preferably 99.4:0.6 to 30:70 by weight.

The other component: sulfonic and/or phosphoric acid metal salt having a good heat resistance is a sulfonic said metal salt and/or a phosphoric acid metal salt which has an initial temperature of showing a substantial decrease in weight being 200° C. or higher when it is heated in air. That is, when the compound is heated in air and the weight thereof is measured by a thermobalance, the weight decrease of the compound substantially initiates after passed the induction period, as shown in the accompanying drawing, and in the present specification and claims, the initial temperature of showing a substantial decrease in weight means the temperature at which the weight decrease of the compound substantially initiates after passed the induction period.

The sulfonic and/or phosphoric acid metal salt used in the present invention should have a good heat resistance and is represented by the following formulae:

$$R_1SO_3Me \quad \text{(I)}$$

$$R_1—O—\overset{\overset{O}{\|}}{\underset{\underset{OX}{|}}{P}}—OMe \quad \text{(II)}$$

$$H—(OR_2)_l—O—[\overset{\overset{O}{\|}}{\underset{\underset{OMe}{|}}{P}}—O—(R_3O)_m]_n—H \quad \text{(III)}$$

wherein $R_1$ is an alkyl, aryl, aralkyl or alkylaryl having 8 to 20 carbon atoms, or a group of the formula: $—(R_4O)_p—R_5$ wherein $R_4$ is a divalent saturated hydrocarbon group having 2 to 4 carbon atoms, $R_5$ is an alkyl, aryl, aralkyl or alkylaryl having 8 to 20 carbon atoms, p is such a numeral that the molecular weight of the chain: $—(R_4O)—$ is included in the range of 32 to 2000;

Me is an alkali metal or an alkaline earth metal;

X is hydrogen atom, or the group $R_1$ or Me abovementioned, when two groups of $R_1$ or Me are present, they may be the same or different from each other;

l and m are each such a numeral that the molecular weight of the chain: $—(OR_2)—$ or $—(R_3O)—$ is included in the range of 32 to 2000, respectively;

n is an integer of 2 to 50; and $R_2$ and $R_3$ are the same or different, and are each a saturated hydrocarbon group having 2 to 4 carbon atoms.

Suitable examples of these groups are as follows:

$R_1$: octyl, nonyl, decyl, undecyl, dodecyl, octadecyl, phenyl, naphthyl, methylphenyl, octylphenyl, dodecylphenyl, octylnaphthyl, nonylnaphthyl, dodecylphenyl, phenylmethyl, phenyloctyl, naphthylmethyl, $—(OCH_2CH_2)_p—OC_8H_{17}$, $$—(OCH_2CH_2)_q—(O\underset{\underset{CH_3}{|}}{C}HCH_2)_r—OC_{10}H_{21}\ (q + r = p), \text{ or}$$

$$—(O\underset{\underset{CH_3}{|}}{C}HCH_2)_p—OC_{12}H_{25}$$

or a mixture thereof;

Me: sodium, potassium, calcium, barium, or magnesium;

$R_2$ and $R_3$:

$$—CH_2CH_2—,\ —\underset{\underset{CH_3}{|}}{C}HCH_2—,$$

$—(CH_2)_4—$, or a mixture of $—CH_2CH_2—$ and $$—\underset{\underset{CH_3}{|}}{C}HCH_2—.$$

Suitable examples of the sulfonic acid metal salt are sodium octylsulfonate, sodium decylsulfonate, sodium dodecylsulfonate, potassium dodecylsulfonate, sodium salt of a mixture of alkylsulfonic acids wherein the alkyl moiety has an average carbon number of 8 to 20, sodium octylbenzenesulfonate, sodium nonylbenzenesulfonate, sodium dodecylbenzenesulfonate, potassium dodecylbenzenesulfonate, sodium nonylnaphthalenesulfonate, sodium dodenylnaphthalenesulfonate, potassium dodecylnaphthalenesulfonate,

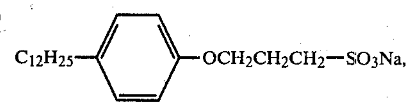

$$C_{12}H_{25}—O(CH_2CH_2O)_4CH_2CH_2CH_2—SO_3K,$$

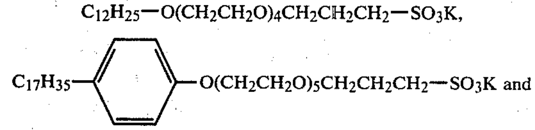

$$C_9H_{19}—O(CH_2CH_2O)_4(CH_2)_3—SO_3Na.$$

These may be used alone or in a combination of two or more thereof.

Suitable examples of the phosphoric acid metal salt are $$C_{12}H_{25}O—\overset{\overset{O}{\|}}{\underset{\underset{ONa}{|}}{P}}—ONa,\ [C_9H_{19}O—\overset{\overset{O}{\|}}{\underset{\underset{OC_9H_{19}}{|}}{P}}—O—]_2Mg,$$

$$C_{17}H_{35}—O(CH_2CH_2O)_5—\overset{\overset{O}{\|}}{\underset{\underset{ONa}{|}}{P}}—ONa,$$

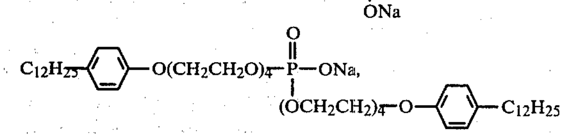

$$H(OCH_2CH_2)_5—O—[\overset{\overset{O}{\|}}{\underset{\underset{ONa}{|}}{P}}—O(CH_2CH_2O)_5]_{20}—H,$$

$$C_{12}H_{25}O—(CH_2CH_20)_3—(CH_2\underset{\underset{CH_3}{|}}{C}HO)_3—CH_2CH_2O—\overset{\overset{O}{\|}}{\underset{\underset{ONa}{|}}{P}}—ONa \text{ and}$$

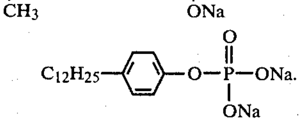

These may be used alone or in a combination of two or more thereof.

These sulfonic and/or phosphoric acid metal salt having a good heat resistance may be used alone or in a combination of two or more thereof in an amount of 0.05 to 5 parts by weight, preferably 0.1 to 3% by weight, on the basis of the whole weight of the components (i), (ii) and (iii). The compound can give the excellent antistatic properties, which are little effected with variation of the humidity, in a comparatively small amount thereof. When the compound is added in an amount larger than 5% by weight, the effect thereof does not increase and rather it shows an adverse result, such as the decrease of the transparency and the decrease of the physical properties owing to the promotion of the heat deterioration of the polyester film.

The blending of the terephthalic polyester, the block copolyester and the sulfonic and/or phosphoric acid metal salt having a good heat resistance can be carried out by various methods, for instance, by adding the block copolyester and the metal salt to the polymerization reaction system of the terephthalic polyester when the polymerization reaction is finished, or by supplying the prescribed amounts of the terephthalic polyester, the block copolyester and the metal salt to an inlet of an extruder and then melt-kneading the mixture. Other additives, such as a surfactant, ultraviolet absorber, antioxidant, lubricant, fire retardant, pigment, dyestuff, or the like may also be added to the blend.

The mixture thus blended is then formed into a film by the conventional film-forming methods, for instance, T-die method, or inflation method, by which a non-drawn film is formed. The desired polyester film of the present invention can be produced by drawing the non-drawn film at least uniaxially, preferably biaxially, by which the excellent properties thereof are more effectively given to the film. The drawing may be carried out under similar conditions as those in the drawing of the conventional terephthalic polyester, but when the block copolyester and the sulfonic and/or phosphoric acid metal salt are blended in a high ratio, the conditions may be varied appropriately. The drawing temperature useful in the present invention is preferably 60° to 120° C. in case of uniaxial or biaxial drawing. This drawing of the film is the most important factor for obtaining the desired polyester film having excellent properties, and the film should be at least uniaxially drawn and it is particularly desirable to draw biaxially in a rectangular direction to each other, simultaneously or successively. In case of biaxial drawing, the first drawing is carried out at a drawing temperature of 60° to 120° C., preferably 60° to 100° C. and the second drawing is carried out at a drawing temperature same as or higher than the drawing temperature of the first drawing but lower than 120° C. The draw ratio is not specifically limited, but it is usually 1.2 to 6 times, preferably, 1.5 to 6 times, in case of the uniaxial drawing and is perpendicularly 1.2 to 6 times and laterally 1.2 to 6 times in case of the biaxial drawing.

After the film formation and the drawing thereof, it is essential to subject the resultant to the heat treatment. The heat treatment may be usually carried out at a temperature of 170° C. or higher and lower than the melting point of the terephthalic polyester (i) for 0.1 second to 5 minutes. A higher temperature is more preferable since it can be carried out within a shorter time. The heat treatment may be carried out by exposing the drawn film into an atmosphere at the above temperature or by contacting the film with a roller heated at the above temperature, but is not limited thereto. Besides, the heat treatment may be carried out at the shrunk or pulled state or a normal state of the film, but in case of treatment at the shrunk state, the rate of shrinkage is preferably within 50%, and in case of treatment at the pulled state, the rate of pulling is preferably within 150%.

The polyester film of the present invention has excellent flexing resistance, pinhole resistance, and printability with a conventional printing ink for cellulose films and further illustrates excellent antistatic properties which are little effected with variation of the humidity, and therefore, is useful as a packaging material.

The polyester film of the present invention is characteristic in its excellent printability, that is, the present polyester film can be printed with the conventional printing ink for cellulose films at a high speed. When the conventional polyester films, for instance polyethylene terephthalate film is printed with a printing ink for cellulose films, the adhesion of the film with the printing ink is inferior and the printing ink layer is peeled off from the polyester film. Accordingly, in the case of the conventional polyester film it is required to use a specifically formulated printing ink. To the contrary, the polyester film of the present invention can be printed with the commercially available printing inks for cellulose films wherein cellulose derivatives such as nitrocellulose, methylcellulose, ethylcellulose, hydroxyethylcellulose or cellulose acetate are used as the binder.

The printing ink useful for the present polyester film contains the above-mentioned binder which may be incorporated with other binder, such as polyamide resins, synthetic rubbers, resins, ester gums (e.g. glycerol ester), urea resins, or melamine resins. The printing ink contains inorganic or organic pigments or dyestuffs, such as titanium white, chrome yellow pigment, copper powder, phthalocyanine blue, or the like, which may be selected in accordance with the desired color. These components are admixed with a suitable organic solvent, such as aromatic hydrocarbons, alcohols, esters, ketones or the like (e.g. benzene, toluene, xylene, or ethyl acetate), whereby the viscosity of the mixture is controlled. The printing ink may also contain volatile varnish, or the like, as the vehicle. The printing ink may further contain an appropriate amount of other ingredients, such as stabilizers, plasticizers, weathering agents, natural resins, rubber derivatives, lubricants, or gloss agents.

The printing ink may be applied to the polyester film in an amount of 0.05 to 15 $g/m^2$, preferably 0.1 to 5 $g/m^2$. Prior to the application of the printing ink, the polyester film may be subjected to a surface treatment, such as corona discharge treatment, flame treatment, or treatment with an acid, by which the polyester film shows more excellent adhesion with the printing ink.

In the printed polyester film, the printing ink is adhered firmly to the film. The application of the printing ink can be carried out by the conventional methods for printing the cellulose films, for instance, various roll coating methods (e.g. rotogravure roll method, or reverse roll method), a blade coating method, a dip coating method, a spray coating method, a flexographic printing method, or the like.

The thickness of the polyester film of the present invention is not specifically limited, but is usually in the range of 1 to 1000μ, preferably 5 to 500μ. The polyester film of the present invention has the excellent characteristics, such as a tensile strength of 15 to 30 $kg/mm^2$, a tensile elongation of 50 to 300%, a pinhole resistance of 300 to 2000 times, a half-life of the charged voltage at a relative humidity of 40% at 20° C. of 1.0 to 300 seconds, a half-life of the charged voltage at a relative humidity of 65% at 20° C. of 0.5 to 100 seconds, and a printability with an ink for cellulose films of 50 to 100%. Such an excellent polyester film has never been found, and is useful for packaging various materials.

The polyester film of the present invention may also be used in the form of a laminated film with a film of the conventional polyesters (e.g. polyethylene terephthalate or polybutylene terephthalate) or other polymers (e.g. polyolefin, polyamide, polyvinyl chloride, polyvinylidene chloride, polystyrene, polyacrylate, or polymethacrylate), which is produced by conventional laminating methods. Besides, a laminated film of the present polyester film with other materials may be produced by coextruding a mixture of the components of the present polyester film and other material, or laminating the components of the present polyester film with other material or laminating by meltextrusion the components of the present polyester film onto other polymer film, and then drawing and heat-treating the resulting laminated product.

The present invention is illustrated by the following Examples, but is not limited thereto. In the Examples, "part" means part by weight unless specified otherwise.

The properties of the polyester film are measured as follows:

(1) Pinhole resistance:

A round film having a diameter of 15 cm is fixed onto the top of a glass tube having a diameter of 10 mm in a bag-like shape and the glass tube is given by an air pressure of 1 kg/cm$^2$ and then a reduced pressure (vacuum), which operations are repeated in the rate of 10 times/-minute. The number of the operations is counted till pinholes occur and the pressure lowers.

(2) Printability:

A film is printed with a white ink for a cellulose tape having the following components by using a gravure printing machine. A commercially available adhesive-backed tape is put on the printing ink layer, and then the tape is rapidly peeled off. The state of the printing ink layer is observed. The printability is shown by the rate (%) of the remaining area of the printing ink layer.

| | |
|---|---|
| Titanium white | 300 parts by weight |
| Nitrocellulose (Product No. SS1/4, made by Daicel Ltd.) | 200 parts by weight |
| Dibutyl phthalate | 50 parts by weight |
| Ethyl acetate | 250 parts by weight |
| Isopropyl alcohol | 100 parts by weight |
| Toluene | 100 parts by weight |
| Total | 1000 parts by weight |

(3) Antistatic properties (half life of the charged voltage):

It is measured at the atmospheres of 20° C. and a relative humidity (RH) of 65%, 40% or 25% using Static Honest Meter (made by Shishido Shokai). The voltage (10,000 V) is charged on the test sample from the height of 15 mm. The damping curve of the charged voltage is depicted and the time until the initially charged voltage becomes ½ (half-time) and the residual voltage when it becomes parallel are measured.

(4) The initial temperature showing a substantial decrease of the weight of antistatic agent:

The antistatic agent is heated in air at a raising rate of 4° C./minute and the weight decrease of the agent is measured by a thermobalance (TM-2 type, made by Shimazu Seisakusho). The relation between the weight decrease and the temperature is shown in the accompanying drawing. The initial temperature is shown at the point of 10% decrease (X point). In the drawing, VI is $C_{12}H_{25}OSO_3Na$, VII is $C_{17}H_{35}O(CH_2CH_2O)_2SO_3Na$, VIII is

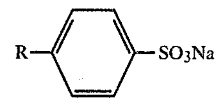

wherein R is a mixture of alkyl groups having an average carbon number of 15, IX is $C_{17}H_{35}SO_3Na$, and X is

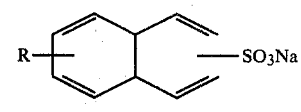

wherein R is a mixture of alkyl groups having an average carbon number of 15.

EXAMPLE 1

(a) Polyethylene terephthalate (intrinsic viscosity: 0.62, in phenol/tetrachloroethane=6/4 at 30° C.),
(b) a block copolyester, which is produced from bishydroxyethyl terephthalate (400 parts), polyethylene oxide glycol (molecular weight: 4000, 400 parts), antimony trioxide (0.4 part) and zinc acetate (0.4 part) by a conventional polymerization method as used for the production of the conventional terephthalic polyester, and
(c) sodium dodecylbenzenesulfonate.

The above components (a), (b) and (c) are mixed together by a blender in the ratio as shown in Table 1. The mixture is melt-extruded by an extruder equipped with T-die (diameter of screw: 20 mm), and then cooled with a cooling roll at 80° C. to give a non-drawn film (thickness: 250μ). The non-drawn film is drawn 3.5 times perpendicularly at 90° C. and 3.5 times laterally at 90° C. and the resultant is set by heating at 200° C. for 30 seconds.

For the comparison purpose, the polyethylene terephthalate alone used above is melt-extruded and drawn and further subjected to the heat set in the same manner as described above (Comparative Example).

On these films, the pinhole resistance, printability and antistatic properties at various humidities are measured. The results are shown in the following Table 1.

As is made clear from the results, the polyester film of the present invention has excellent pinhole resistance, printability with an ink for cellulose films, and antistatic properties at a low humidity.

TABLE 1

| | Amount of block copolyester (% by weight)* | Amount of dodecylbenzenesulfonate (% by weight) | Pinhole resistance (times) | Printability (%) | Half-life of the charged voltage (second) | | |
|---|---|---|---|---|---|---|---|
| | | | | | Relative humidity 65% | Relative humidity 40% | Relative humidity 25% |
| Comp. Example | 0 | 0 | 300 | 0 | >400 | >400 | >400 |
| Examples of the | 2.0 | 1.0 | 600 | 100 | 2.0 | 3.0 | 17.0 |
| present invent- | 3.0 | 1.0 | 480 | 100 | 1.5 | 2.0 | 12.0 |

TABLE 1-continued

| | Amount of block copolyester (% by weight)* | Amount of dodecyl-benzene-sulfonate (% by weight) | Pinhole resistance (times) | Printability (%) | Half-life of the charged voltage (second) Relative humidity 65% | Relative humidity 40% | Relative humidity 25% |
|---|---|---|---|---|---|---|---|
| ion | 4.0 | 1.0 | 450 | 100 | 1.5 | 1.5 | 8.0 |

*It is shown by the content of the polyethylene oxide glycol in the whole components from which the film is formed.

EXAMPLE 2

Various films are produced by using the block polyesters, and the sulfonic and/or phosphoric acid metal salts as shown in Tables 2, 3 and 4 in the same manner as described in Example 1. The characteristics of the films thus obtained are shown in Tables 5 and 6.

For comparison purpose, some films are produced likewise, excepting that the components are outside the present invention. The characteristics are also shown in Table 5 and 6.

As is made clear from the results, the polyester films of the present invention are superior in the pinhole resistance, printability and antistiatic properties at a low humidity.

TABLE 2

| | Block copolyester: Polyester segment having a high melting point — Structure | ratio of copolymerization (% by weight) | Non-crystalline segment having a low melting point — Structure | molecular weight | ratio of copolymerization (% by weight) |
|---|---|---|---|---|---|
| I | Polyethylene terephthalate | 30 | Polyethylene Oxide glycol | 2000 | 70 |
| II | Polyethylene terephthalate | 30 | Polyethylene Oxide glycol | 4000 | 70 |
| III | Polyethylene terephthalate | 50 | Polyethylene Oxide glycol | 2000 | 50 |
| IV | Polytetra-methylene terephthalate | 60 | Polytetra-methylene oxide glycol | 1500 | 40 |
| V | Polytetra-methylene terephthalate | 70 | Polytetra-methylene oxide glycol | 1500 | 30 |

TABLE 3

| | Sulfonic acid metal salt — Structure | | Initial temperature of weight decrease (°C.)* |
|---|---|---|---|
| VI | $C_{12}H_{25}OSO_3Na$ | (Comparative) | 158 |
| VII | $C_{17}H_{35}O(CH_2CH_2O)_2SO_3Na$ | (Comparative) | 195 |
| VIII | 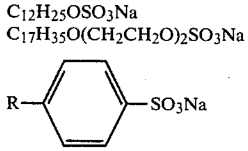 | (R is a mixture of alkyl groups of an average carbon number of 15) | 280 |
| IX | $C_{17}H_{35}SO_3Na$ | | 325 |
| X | 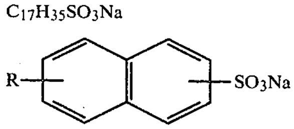 | (R is a mixture of alkyl groups of an average carbon number of 15) | 226 |

*The initial temperature is shown in the accompanying drawing.

TABLE 4

| | Phosphoric acid metal salt and other antistatic agent having a high initial temperature of weight decrease — Structure | Initial temperature of weight decrease (°C.) |
|---|---|---|
| XI | $C_{13}H_{27}N[(CH_2CH_2O)_3H]_2$ (Comparative) | 240 |
| XII | 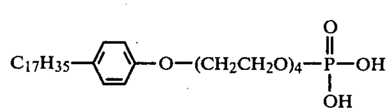 (Comparative) | 220 |

TABLE 4-continued

| Phosphoric acid metal salt and other antistatic agent having a high initial temperature of weight decrease — Structure | | Initial temperature of weight decrease (°C.) |
| --- | --- | --- |
| XIII | 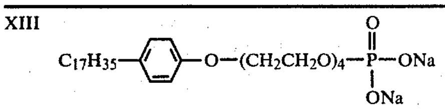 | 210 |
| XIV | 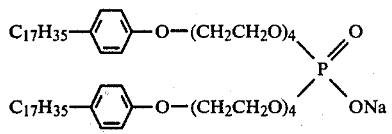 | 210 |
| XV | 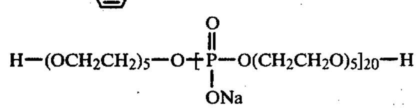 | 220 |

TABLE 5

| | Block copolyester | | Sulfonic acid metal salt | | | | Half-life of the charges voltage (second) | | |
| --- | --- | --- | --- | --- | --- | --- | --- | --- | --- |
| | Compound | Amount* (% by weight) | Compound | Amount (% by weight) | Pinhole resistance (times) | Printability (%) | Relative humidity 65% | Relative humidity 40% | Relative humidity 25% |
| Comp. Example | I | 3.0 | — | — | 450 | 100 | 180 | >400 | >400 |
| | II | 3.0 | — | — | 450 | 100 | 150 | >400 | >400 |
| | III | 3.0 | — | — | 450 | 100 | 180 | >400 | >400 |
| | IV | 3.0 | — | — | 500 | 100 | >400 | >400 | >400 |
| | V | 3.0 | — | — | 500 | 100 | >400 | >400 | >400 |
| | — | — | VI | 1.0 | 200 | 0 | >400 | >400 | >400 |
| | — | — | VII | 1.0 | 200 | 0 | >400 | >400 | >400 |
| | — | — | VIII | 1.0 | 200 | 0 | 3.0 | >400 | >400 |
| | — | — | IX | 1.0 | 200 | 0 | 5.0 | >400 | >400 |
| | — | — | X | 1.0 | 200 | 0 | 10.0 | >400 | >400 |
| | I | 3.0 | VI | 1.0 | 200 | 100 | 180 | >400 | >400 |
| | I | 3.0 | VII | 1.0 | 200 | 100 | 180 | >400 | >400 |
| Examples of the present invent-ion | I | 3.0 | VIII | 1.0 | 450 | 100 | 1.5 | 2.0 | 12.0 |
| | I | 3.0 | IX | 1.0 | 450 | 100 | 1.5 | 2.0 | 18.0 |
| | I | 3.0 | X | 1.0 | 450 | 100 | 1.5 | 2.0 | 32.0 |
| | II | 3.0 | VIII | 1.0 | 450 | 100 | 1.5 | 2.0 | 8.0 |
| | III | 3.0 | IX | 1.0 | 450 | 100 | 1.5 | 2.0 | 17.0 |
| | VI | 3.0 | VIII | 1.0 | 500 | 100 | 1.5 | 10.0 | 32.0 |
| | V | 3.0 | IX | 1.0 | 500 | 100 | 1.5 | 10.0 | 51.0 |

*It is shown by the content of the non-crystalline polymer segment having a low melting point in the whole components from which the film is formed.

TABLE 6

| | Block copolyester | | Antistatic agent | | | | Half-life of the charges voltage (second) | | |
| --- | --- | --- | --- | --- | --- | --- | --- | --- | --- |
| | Compound | Amount (% by weight) | Compound | Amount (% by weight) | Pinhole resistance (times) | Printability (%) | Relative humidity 65% | Relative humidity 40% | Relative humidity 25% |
| Comp. Example | I | 3.0 | XI | 1.0 | 450 | 100 | >400 | >400 | >400 |
| | I | 3.0 | XII | 1.0 | 450 | 100 | >400 | >400 | >400 |
| Examples of the present invent-ion | I | 3.0 | XIII | 1.0 | 450 | 100 | 1.0 | 5.0 | 23.0 |
| | I | 3.0 | XIV | 1.0 | 450 | 100 | 1.0 | 5.0 | 45.0 |
| | I | 3.0 | XV | 1.0 | 450 | 100 | 1.0 | 5.0 | 57.0 |
| | I | 3.0 | XIII & XIV | 0.5 & 0.5 | 450 | 100 | 1.0 | 5.0 | 32.0 |

EXAMPLE 3

To polyethylene terephthalate used in Example 1 is added the compound No. I in Table 2 or the compound No. VIII in Table 3 in an amount of 3% by weight and 1% by weight, respectively on the basis of the whole weight of the components. The mixture is biaxially drawn in the same manner as described in Example 1. The drawn film is heat-treated under various conditions, and the characteristics of the resulting films are measured. The results are shown in Table 7.

TABLE 7

| | Temperature for heat treatment (°C.) × 30 minutes | Pinhole resistance (times) | Printability (%) | Half-life of the charged voltage (second): Relative humidity 65% | Relative humidity 40% | Relative humidity 25% |
| --- | --- | --- | --- | --- | --- | --- |
| Comp. Examples | 100 | 450 | 100 | >400 | >400 | >400 |
| | 140 | 450 | 100 | >400 | >400 | >400 |
| Examples of the invention | 180 | 450 | 100 | 3.0 | 3.0 | 37.0 |
| | 210 | 450 | 100 | 1.5 | 2.0 | 25.0 |
| | 230 | 450 | 100 | 1.5 | 2.0 | 25.0 |

As is made clear from the results, the polyester films of the present invention show excellent pinhole resistance, printability and antistatic properties which are little effected with variation of the humidity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyester film printed with a printing ink for cellulose films, said polyester film being made from a mixture comprising:

(1) a polyester consisting essentially of a residue of dibasic acids wherein at least 80% by mol is terephthalic acid and a residue of at least one glycol;

(2) A block copolyester consisting of a crystalline polyester segment having a melting point of at least 170° C. when a polymer is produced by the monomers composing this segment alone and a polymer segment having a melting or softening point of 100° C. or lower, said polymer segment having a melting or softening point of 100° C. or lower being contained in an amount of 0.5 to 10% by weight on the basis of the whole weight of the components (1) and (2); and (3) a sulfonic and/or phosphoric acid alkali metal or alkaline earth metal salt having good heat resistance, said sulfonic and/or phosphoric acid metal salt being contained in an amount of 0.05 to 5% by weight on the basis of the whole weight of the components (1), (2), and (3), which is produced by melt-extruding the mixture of the components (1), (2), and (3), drawing at least uniaxially and then heat-treating at a temperature of 170° C. or higher, and lower than the melting point of the polyester (1).

2. The polyester film according to claim 1, wherein the block copolyester is a polyester comprising a crystalline polyester segment having a metling point of at least 170° C. when a polymer is produced by the monomers composing this segment alone and a polymer segment having a melting point or softening point of 100° C. or lower and a number average molecular weight of 400 to 8,000.

3. The polyester film according to claim 1, wherein the sulfonic acid metal salt is a compound of the formula:

$$R_1\text{—}SO_3Me$$

wherein $R_1$ is an alkyl, aryl, aralkyl or alkylaryl having 8 to 20 carbon atoms, or the group: $\text{—}(R_4O)_p\text{—}R_5$ wherein $R_4$ is a divalent saturated hydrocarbon group having 2 to 4 carbon atoms, $R_5$ is an alkyl, aryl, aralkyl or alkylaryl having 8 to 20 carbon atoms, and p is such a numeral that the molecular weight of the chain: $\text{—}(R_4O)\text{—}$ is included in the range of 32 to 2000; and Me is an alkali metal or an alkaline earth metal.

4. The polyester film according to claim 3, wherein the sulfonic acid metal salt is sodium dodecylbenzenesulfonate.

5. The polyester film according to claim 3, wherein the sulfonic acid metal salt is sodium stearylsulfonate.

6. The polyester film according to claim 3, wherein the sulfonic acid metal salt is sodium alkylsulfonate having an average carbon number of 8 to 20.

7. The polyester film according to claim 1, wherein the phosphoric acid metal salt is a compound of the formula:

$$R_1\text{—}O\text{—}\overset{\overset{O}{\|}}{\underset{\underset{OX}{|}}{P}}\text{—}OMe \text{ or } H\text{—}(OR_2)_l\text{—}O\text{—}[\overset{\overset{O}{\|}}{\underset{\underset{OMe}{|}}{P}}\text{—}O\text{—}(R_3O)_m]_n\text{—}H$$

wherein $R_1$ is an alkyl, aryl, aralkyl or alkylaryl having 8 to 20 carbon atoms, or the group: $\text{—}(R_4O)_p\text{—}R_5$ wherein $R_4$ is a divalent saturated hydrocarbon group having 2 to 4 carbon atoms, $R_5$ is an alkyl, aryl, aralkyl or alkylaryl having 8 to 20 carbon atoms, and p is such a numeral that the molecular weight of the chain: $\text{—}(R_4O)\text{—}$ is included in the range of 32 to 2000;

Me is an alkali metal or an alkaline earth metal;

X is hydrogen or the group $R_1$ or Me above-mentioned, when two groups of $R_1$ or Me are present, they may be the same or different from each other;

l and m are each such a numeral that the molecular weight of the chain: $\text{—}(OR_2)\text{—}$ or $\text{—}(R_30)\text{—}$ is included in the range of 32 to 2000, respectively;

n is an integer of 2 to 50; and $R_2$ and $R_3$ are the same or different, and are each a saturated hydrocarbon group having 2 to 4 carbon atoms.

8. The polyester film according to claim 7, wherein the phosphoric acid metal salt is a compound of the formula:

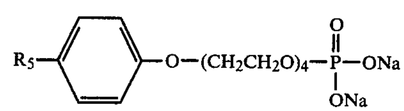

wherein $R_5$ is an alkyl having 8 to 20 carbon atoms.

9. The polyester film according to claim 7, wherein the phosphoric acid metal salt is a mixture of the compounds of the formulae:

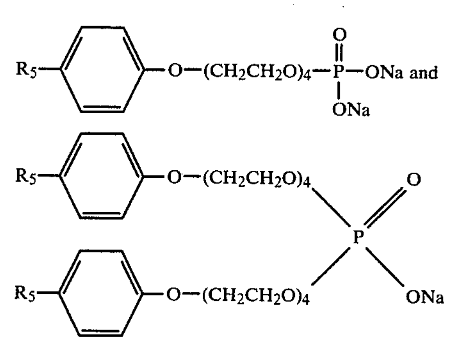

wherein $R_5$ is an alkyl having 8 to 20 carbon atoms.

10. The polyester film according to claim 1, wherein the crystalline polyester segment is a segment comprising predominantly a polyester consisting of a residue of terephthalic acid and a residue of ethylene glycol.

11. The polyester film according to claim 1, wherein the metal of the sulfonic and/or phosphoric acid metal salt is sodium or potassium.

12. The polyester film according to claim 1, wherein the crystalline polyester segment is a segment comprising predominantly a polyester consisting of a residue of terephthalic acid and a residue of tetramethylene glycol.

13. The polyester film according to claim 1, wherein the crystalline polyester segment is a segment comprising predominantly a polyester consisting of a residue of terephthalic acid and isophthalic acid and a residue of ethylene glycol.

14. The polyester film according to claim 1, wherein the crystalline polyester segment is a segment comprising predominantly a polyester consisting of a residue of terephthalic acid and isophthalic acid and a residue of tetramethylene glycol.

15. The polyester film according to claim 1 wherein the polymer segment having a melting or softening point of 100° C. or lower is polyethylene oxide glycol having a molecular weight of 400 to 8000.

16. The polyester film according to claim 1 wherein the polymer segment having a melting or softening point of 100° C. or lower is polytetramethylene oxide glycol having a molecular weight of 400 to 8000.

17. The polyester film according to claim 1, wherein the block copolyester is polyethylene terephthalate-polyethylene oxide block copolymer.

18. The polyester film according to claim 1, wherein the block copolyester is polytetramethylene terephthalate-polytetramethylene oxide block copolymer.

19. The polyester film according to claim 1, wherein the block copolyester is polytetramethylene terephthalate isophthalate-polytetramethylene oxide block copolymer.

20. The polyester film according to claim 1, wherein the block copolyester is polytetramethylene terephthalate-polyethylene oxide block copolymer.

21. The polyester film according to claim 1, wherein the polyester (i) is polyethylene terephthalate.

22. The polyester film according to claim 1, wherein the polyester (i) is polytetramethylene terephthalate.

23. The polyester film according to claim 1, wherein the mixed ratio of the polyester and the block copolyester is in the range of 99.4:0.6 to 20:80 by weight.

24. The polyester film according to claim 1, which is drawn 1.2 to 6 times at least uniaxially.

25. The polyester film according to claim 1, which is drawn perpendicularly and laterally 1.2 to 6 times, respectively.

26. The polyester film according to claim 1, which is drawn biaxially 1.2 to 6 times, respectively, at 60° to 120° C.

27. The polyester film according to claim 26, wherein the biaxial drawing is carried out successively.

28. The polyester film according to claim 1, wherein the heat treatment of the drawn film is carried out for 0.1 second to 5 minutes.

* * * * *